Feb. 22, 1966  W. SCHENKEL  3,236,145
EXPANSION DOWEL
Filed Aug. 5, 1963
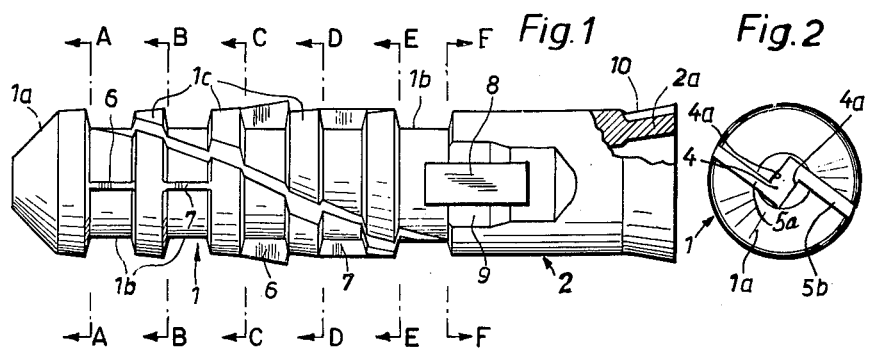
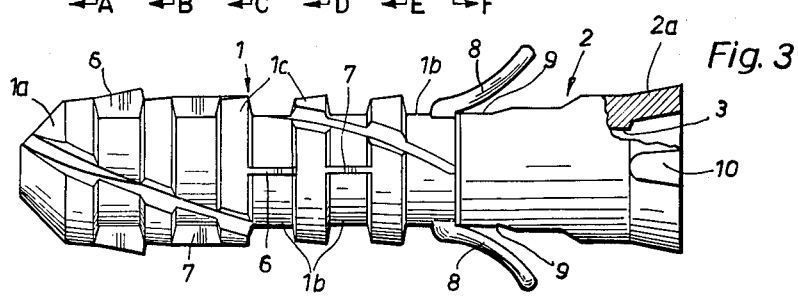
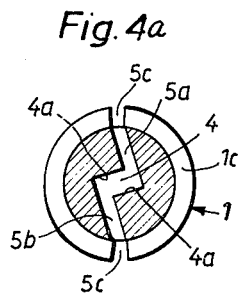 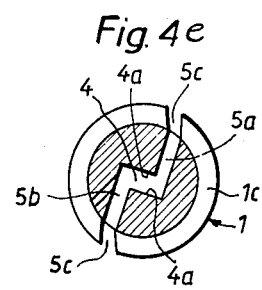 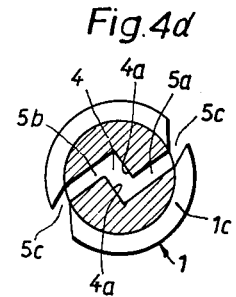
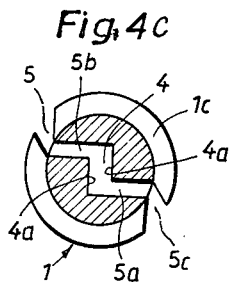 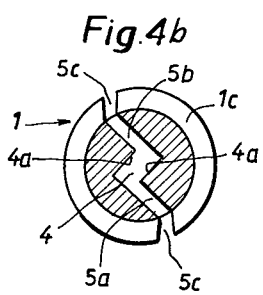 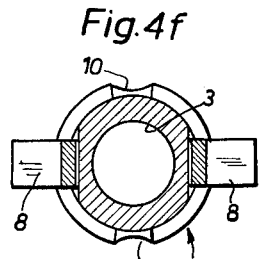
INVENTOR
WILLI SCHENKEL

United States Patent Office 3,236,145
Patented Feb. 22, 1966

3,236,145
EXPANSION DOWEL
Willi Schenkel, Zurich, Switzerland, assignor to
Glarex A.-G., Glarus, Switzerland
Filed Aug. 5, 1963, Ser. No. 300,011
Claims priority, application Switzerland, Aug. 7, 1962,
9,391/62
6 Claims. (Cl. 85—83)

The present invention relates to an expansion dowel of the type having a dowel body which is slit from its inner end over a part of its length, having a bore extending inwardly from its outer end for the insertion of a fastening screw, and provided with annular grooves on the periphery of the slit portion. With conventional dowels of this type the dowel body usually comprises at least one longitudinal axial slit extending over the whole cross section of the dowel and over the whole length of the expansible portion of the dowel, separating the dowel body in two parts which are symmetrical with respect to the dowel axis. This type of expansion dowel offers the advantage, in comparison to known dowels having tubular slit expansion sockets, that more material is available for expanding the sections formed by the slit or slits, which renders the dowel more suitable to varying boring diameters.

The relatively large expansion range of such known axially slit dowels has however the disadvantage, that upon insertion of the fastening screw, the slits open so far that the axial guiding of the screw is no longer guaranteed, the screw is deviated even by small transverse forces, and can penetrate laterally through the expanded slits. This in turn causes a decrease of the expanding force and moreover, the screw head no longer lays flat against the member to which it is to be fastened. Therefore with such disadvantages, the practical use of such known spreader dowels is limited.

The object of the present invention is the provision of a dowel which combines the advantages of a wide range of expansion owing to the slits, and at the same time provides a perfect axial guiding of the fastening screw.

The expansion dowel according to the invention comprises a dowel body provided with a plurality of slits extending from its inner end in equally spaced angular relationship over a portion of the length of the body, and provided with a bore extending inwardly from its outer end and adapted to receive a fastening screw, the slit portion of the dowel body having a central axial bore forming an extension of said screw receiving bore and being of reduced diameter with respect to said screw receiving bore, said central axial bore communicating with said plurality of slits of the dowel body, said slits each extending along a helical surface which is tangential to said central axial bore and each slit is offset in the direction of screwing-in of said fastening screw with respect to the axis of the dowel body.

The cross sectional area of the dowel according to the invention is sub-divided into relatively large surfaces extending between the angularly spaced slits, because the central longitudinal opening in the slit portion of the dowel body is of smaller diameter, than the screw insertion opening of the remaining outer portion of the body. On the other hand, owing to the helical slits the fastening screw when introduced into the dowel body, is better centered, since the dowel body sections between the slits engage the screw over its axial length at points which are displaced in circumferential direction, so that the screw is positively maintained in the dowel axis. Besides, since the slits are laterally off-set in the screwing-in direction of the fastening screw with respect to the dowel axis, the screw which is in frictional contact with the slit sections of the dowel tends to close the slits so as to assist in preventing a lateral deflection of the screw through the slits.

The accompanying drawings illustrate an example of the expansion dowel according to the invention:

FIGURE 1, a view in elevation of the dowel;
FIGURE 2, an end view of the dowel;
FIGURE 3 is a view in elevation of the dowel turned through an angle of 90° with respect to FIGURE 1;
FIGURES 4a to 4f each shows a transverse section through the dowel according to the lines A—A, B—B, C—C, D—D, E—E or F—F, respectively in FIGURE 1.

In the drawing, the numeral 1 designates the slit inner body portion of the dowel body, and 2 the unslit outer head portion of the dowel, through which the fastening screw (not shown) is introduced. The cylindrical expansible body portion 1 of the dowel is provided with longitudinally spaced annular grooves 1b, arranged at equal axial intervals between which annular ribs 1c are formed. The annular grooves 1b determine the core cross-section of the expansible part of the dowel. The axially extending bore 3 of the cylindrical socket 2 for insertion of the fastening screw is conically tapering towards the slit portion 1 of the dowel, and converts there into an axial central bore 4 of square cross section, which extends until the conical tapered point 1a of the dowel. The cross section of this central opening 4 which as shown by the drawing is of considerably smaller diameter than the opening 3, is helically twisted through 180° over the length of the expansible portion 1. Two longitudinal slits 5a and 5b open tangentially into the bore 4. These slits extend helically over the whole length of the dowel portion 1 and co-axially to the dowel axis; the pitch of the slits 5a, 5b is equal to the pitch of the helical central opening 4. The angular distances between both slits 5a and 5b measured on the periphery of the dowel-core 1b are equal and since the slits are parallel to each other and have the same distance from the dowel axis, they divide each core cross section of the portion 1 of the dowel into two similar portions of relatively large surface.

The lateral off-set of the slits 5a, 5b with respect to the dowel axis is effected in clockwise direction in the illustrated example; the same clockwise direction of winding is also imparted to the helical slits 5a, 5b themselves. This off-setting of the slits 5a and 5b, arranged in a clockwise direction, determines the use of a right hand threaded fastening screw. When screwing such a screw into the center opening 4, the frictional contact between the screw and the adjacent internal surfaces 4a causes a slight deformation of the sections separated by the slits 5a, 5b in a direction of closing the slits; in this manner, in addition to the effect of the helical path of the slits, it is obtained that the end of the screw remains in the axis of the central opening 4, and does not deviate laterally through the slits. It is evident that an off-setting of the slits 5a, 5b in an anti-clockwise direction with respect to the opening 4, that is to the left in the drawing, combined with the use of a right hand threaded screw owing to frictional contact on wall surfaces 4a, would have the effect of opening the slits, so that in spite of the helical path of the slits, the danger of a lateral deviation of the screw would be possible. On the other hand, the helical slits 5a, 5b could be wound in anti-clockwise direction, opposite to the winding of the helical surfaces of the fastening screw. As previously mentioned, it is only necessary, that the off-setting of the slits with respect to the dowel axis is provided in the direction of screwing of the fastening screw, or to lead the screw in its rotation to expand the dowel, while the helical slits themselves can be wound in one or the other direction, whereby screws with either left or right hand threads can be used.

In the example shown, the slits 5a and 5b, extend over one half turn of the dowel. However, the slits could follow a flatter course than shown i.e. the pitch of the helical slits could be smaller than the double axial length of the split dowel portion 1.

A special problem is posed by the slit openings in the ribs 1c. If for example the dowel is made of plastic material, it should be possible to produce it by using a two part die casting mold separated longitudinally through the dowel axis, and by using a central core. In order to extract the cast pieces from the mold the slit openings 5c in the ribs 1c must open at right angles to the separating surface of the mold (in FIGURES 4a to 4f for example, this surface extends at right angles to the plane of the drawing and through the horizontal middle line of the cross-section) and must slightly diverge outwards, as shown in FIGURES 4a to 4f. Axially directed webs 6, 7 are arranged diametrically opposite each other between adjacent ribs 1c. Care must be taken that the webs are not situated near the opening of the slits 5a, 5b and that, in case of plastic dowels, allow the opening of the two-part mold. The webs 6 are slightly increasing in height towards the outer end of the dowel, so as to protrude above the outer circumference of the ribs 1c, and to thereby increase the adherence of the dowel in a wall opening. At the outer end of the expansible portion 1 of the dowel, two flexible tongues 8 are provided and extend from the base of the last annular groove 1b in outwardly inclined diametrically opposite direction. In the vicinity of these tongues 8, the rear part of the socket 2 is provided with two opposite flattened portions 9. When the dowel is inserted in a wall opening, these tongues are applied against the flattened portions 9 and assist in preventing a movement of rotation of the dowel in the wall hole.

The slightly conically widening end section 2a of the socket part 2 is squeezed resiliently inwards when the dowel is inserted in the wall opening and therefore is slightly corrugated. In order to facilitate a resilient yielding of the end section 2a when the dowel is inserted, marginal notches 10 can be provided as shown in FIGURES 3 and 4f.

In the example described, the dowel is provided with two slits 5a, 5b arranged diametrically opposite each other. It is however possible to provide a dowel with three helical slits which are angularly spaced through 120°, said slits extending tangentially to the central axial bore of the dowel body and opening into said bore at points off-set with respect to the dowel axis in the rotational direction of screwing-in of the fastening screw.

I claim:

1. An expansion dowel comprising a head portion and an integral axially projecting generally cylindrical expansible body portion provided with a plurality of slits each slit being defined by a pair of parallel walls and extending from the outer end of the body in equally spaced angular relationship up to the head portion, said head portion having an axial bore adapted to receive a fastening screw, said expansible portion of the body having an axial bore of polygonal cross-sectional formation having opposing walls with one wall being substantially parallel to the other wall, said bore forming an extension of said screw receiving bore in the head portion and being of substantially reduced dimensions in cross section with respect to said head portion bore, said axial bore in the expansible portion communicating with said plurality of slits, said slits each extending along a helical surface and having one wall thereof forming a continuation of one adjacent wall of the bore of polygonal cross section, said slits passing completely from said bore of polygonal cross section through the body and passing through the exterior surface thereof, and each slit being laterally offset from the axis of the body in a direction to lead a fastening screw while rotated to expand the dowel, whereby screwing in of a fastening screw upon contact with the walls of the axial bore tends to deform them in a direction of closing said slits.

2. An expansion dowel according to claim 1 wherein said axial bore in said expansible body portion is of square cross secton formed as a helix lengthwise of said expansible portion with a pitch substantially equal to the pitch of said slits.

3. An expansion dowel according to claim 1, in which said expansible body portion of the dowel is provided with two helical slits extending outwardly in opposite directions, each slit having a length sufficient to extend over at least one half of the circumferential surface of the dowel body.

4. An expansion dowel according to claim 3, wherein said expansible portion is provided with a plurality of annular ribs separated by grooves on its exterior, said slits opening towards one side on one half, and towards the opposite side on the other half of the circumferential surface of said expansible portion of the body.

5. An expansion dowel according to claim 4, in which axially extending webs are provided in the grooves between said annular ribs, said webs being arranged clear of the slit openings of the body and protruding partially above the height of the ribs.

6. An expansion dowel according to claim 4, in which two flexible tongues extend in opposite direction from the base of the outermost annular groove of said expansible portion obliquely outwards and towards the outer end of the body, and flattened areas being provided on the surface of said outer end of the body over which said tongues extend.

References Cited by the Examiner

UNITED STATES PATENTS

| | | |
|---|---|---|
| 1,795,279 | 3/1931 | McIntosh. |
| 2,024,064 | 12/1935 | Schaefer. |
| 2,543,683 | 2/1951 | Arisman. |

FOREIGN PATENTS

| | | |
|---|---|---|
| 100,462 | 3/1937 | Australia. |
| 236,042 | 10/1961 | Australia. |
| 406,083 | 2/1934 | Great Britain. |
| 455,280 | 10/1934 | Great Britain. |

CARL W. TOMLIN, *Primary Examiner.*

EDWARD C. ALLEN, *Examiner.*